United States Patent
Pedersen et al.

(10) Patent No.: US 10,430,512 B1
(45) Date of Patent: Oct. 1, 2019

(54) METHODS, APPARATUSES AND COMPUTER PROGRAM PRODUCTS FOR FORMATTING MESSAGES IN A MESSAGING USER INTERFACE WITHIN A GROUP-BASED COMMUNICATION SYSTEM

(71) Applicant: Slack Technologies, Inc., San Francisco, CA (US)

(72) Inventors: Andreas Haugstrup Pedersen, San Francisco, CA (US); Christopher Montrois, Redwood City, CA (US)

(73) Assignee: Slack Technologies, Inc., San Francisco, CA (US)

( * ) Notice: Subject to any disclaimer, the term of this patent is extended or adjusted under 35 U.S.C. 154(b) by 0 days.

(21) Appl. No.: 15/989,038

(22) Filed: May 24, 2018

(51) Int. Cl.
*G06F 17/27* (2006.01)
*G06F 17/30* (2006.01)

(52) U.S. Cl.
CPC ................. *G06F 17/2705* (2013.01)

(58) Field of Classification Search
CPC .................................. G06F 17/2705
See application file for complete search history.

(56) References Cited

U.S. PATENT DOCUMENTS

| | | | | |
|---|---|---|---|---|
| 6,529,942 B1* | 3/2003 | Gilbert | ............... | H04L 12/1886 709/206 |
| 7,546,465 B2* | 6/2009 | Kent, Jr. | ............. | G06Q 10/107 713/176 |
| 9,100,355 B2* | 8/2015 | Tomkow | ................. | H04L 51/30 |
| 2009/0287920 A1* | 11/2009 | Fernandez | .......... | H04L 63/0428 709/227 |
| 2010/0106781 A1* | 4/2010 | Gupta | ..................... | H04L 51/18 709/206 |
| 2011/0105157 A1* | 5/2011 | Nguyen | ................... | H04Q 9/00 455/466 |
| 2012/0016655 A1* | 1/2012 | Travieso | ............ | G06F 17/2827 704/2 |
| 2015/0036928 A1* | 2/2015 | Sheth | ................. | G06K 9/00442 382/187 |
| 2017/0147202 A1* | 5/2017 | Donohue | ............ | G06F 3/04886 |

OTHER PUBLICATIONS

Sitepoint.com, Jun. 18, 2014, pp. 1-3 https://www.sitepoint.com/use-unicode-create-bullet-points-trademarks-arrows/.*

\* cited by examiner

*Primary Examiner* — Scott T Baderman
*Assistant Examiner* — Mario M Velez-Lopez
(74) *Attorney, Agent, or Firm* — Alston & Bird LLP

(57) ABSTRACT

An apparatus is provided configured for parsing and formatting a message in a group-based communication interface. The apparatus includes a memory and a processor(s) configured to receive an input string generated through user engagement of the group-based communication interface. The processor is also configured to parse the input string to identify a structured format string. The processor is further configured to, in a circumstance where the structured format trigger is identified in the input string, apply a structured format to the input string to generate a structured message object for rendering to the group-based communication interface. Corresponding methods and computer program products are also provided.

20 Claims, 10 Drawing Sheets

- cmd+b - bold
- cmd + i - italics
- cmd + shift + x - strikethrough
- cmd + shift + c - code
- cmd + shift + 7 - numbered list
- cmd + shift + 8 - bullet list
- Start a line with * or - for a bullet list
- * Start a line with 1. or 1) for a numbered list

John Doe   4:09 PM
Here's the agenda:
1. New company-wide vacation policy.
2. 2017 Bonus updates.
3. Quarterly hiring goals.

Cookies will be provided!

US 10,430,512 B1

METHODS, APPARATUSES AND COMPUTER PROGRAM PRODUCTS FOR FORMATTING MESSAGES IN A MESSAGING USER INTERFACE WITHIN A GROUP-BASED COMMUNICATION SYSTEM

BACKGROUND

Messaging applications and similar services have become a primary mode of device-to-device communication. Applicant has identified many deficiencies and problems associated with existing messaging applications. Through applied effort, ingenuity, and innovation, these identified deficiencies and problems have been solved by developing solutions that are in accordance with the embodiments of the present invention, many examples of which are described in detail herein.

BRIEF SUMMARY

In general, embodiments of the present invention provide methods, apparatuses, systems, computing devices, and/or the like that are configured for formatting messages in a messaging user interface of a group-based communication system based in part on utilizing one or more keyboard shortcuts and storing the messages in a storage device based in part on the formatting language of the storage device.

In one example embodiment, an apparatus configured for parsing and formatting a message in a group-based communication interface is provided. The apparatus may include a processor and memory including computer program code. The memory and the computer program code are configured to, with the processor, cause the apparatus to at least perform operations including receiving an input string generated through user engagement of the group-based communication interface. The at least one memory and the computer program code are further configured to, with the processor, cause the apparatus to parse the input to identify a structured format trigger. The at least one memory and the computer program code are further configured to, with the processor, cause the apparatus to in a circumstance where the structured format trigger is identified in the input string, apply a structured format to the input string to generate a structured message object for rendering to the group-based communication interface.

In another example embodiment, a method configured for parsing and formatting a message in a group-based communication interface is provided. The method may include receiving an input string generated through user engagement of the group-based communication interface. The method may further include parsing the input string to identify a structured format trigger. The method may further include, in a circumstance where the structured format trigger is identified in the input string, apply a structured format to the input string to generate a structured message object for rendering to the group-based communication interface.

In yet another example embodiment, a computer program product configured for parsing and formatting a message in a group-based communication interface is provided. The computer program product includes at least one computer-readable storage medium having computer-readable program code portions stored therein. The computer-executable program code instructions may include program code instructions configured to receive an input string generated through user engagement of the group-based communication interface. The program code instructions may also parse the input string to identify a structured format trigger. The program code instructions may also, in a circumstance where the structured format trigger is identified in the input string, apply a structured format to the input string to generate a structured message object for rendering to the group-based communication interface.

BRIEF DESCRIPTION OF THE SEVERAL VIEW OF THE DRAWINGS

Having thus described some embodiments in general terms, references will now be made to the accompanying drawings, which are not drawn to scale, and wherein:

FIG. 4 is a diagram illustrating one or more actions that may be performed on messages being composed in a user interface in accordance with some exemplary embodiments of the present invention;

DETAILED DESCRIPTION OF VARIOUS EMBODIMENTS

Figure 1:
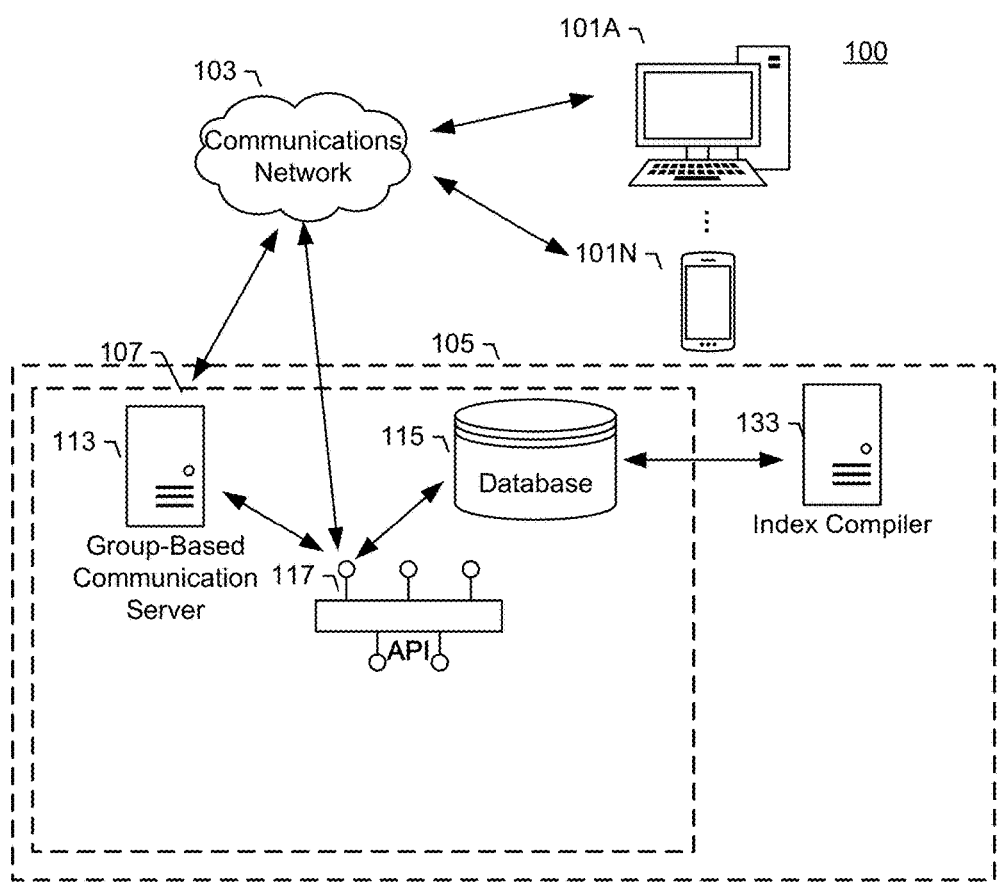
FIG. 1 is an example system infrastructure diagram of a group-based communication platform in accordance with some exemplary embodiments of the present invention.

Various embodiments of the present invention now will be described more fully hereinafter with reference to the accompanying drawings, in which some, but not all embodiments of the invention are shown. Indeed, the invention may be embodied in many different forms and should not be construed as limited to the embodiments set forth herein. Rather, these embodiments are provided so that this disclosure will satisfy applicable legal requirements. The term "or" is used herein in both the alternative and conjunctive sense, unless otherwise indicated. The terms "illustrative," "example," and "exemplary" are used to be examples with no indication of quality level. Like numbers refer to like elements throughout.

Overview

Various embodiments of the present invention relate generally to formatting messages in a messaging user interface of a group-based communication system and storing the messages in a storage device according to a formatting language of the storage device. More specifically, various embodiments of the present invention relate to techniques for enhancing a user experience in composing messages in a user interface based in part on utilizing keyboard/keypad shortcuts to format text within the user interface. Applicant has identified that some messaging applications format text for a message being composed within a message window display by using special characters to add emphasis to one or more words of the message. For instance, some messaging applications may format text by surrounding the text with a symbol (e.g., an asterisk symbol (e.g., "*")) to add bold text to one or more words being composed (e.g., "What time are we leaving for *the basketball game*?") in the message window display. As another example, some messaging applications may format text by surrounding the text with another symbol (e.g., an underscore symbol "_") to italicize the text being composed in a message (e.g., "What time are we leaving for_ the basketball game_?") within the message window display. When the message is sent, the symbols may no longer be visible and the message window display may show the formatted text of the message (e.g., "What time are we leaving for the basketball game?"). As yet another example, some messaging applications may format text by surrounding the text with another symbol (e.g., a tilde symbol "~") to strikethrough a portion of the text being composed in a message (e.g., "What time are we leaving for the basketball game?") within the message window display.

In an instance in which a message is sent, the symbols may no longer be visible and the message window display may show the formatted text of the message (e.g., "What time are we leaving for the basketball game?"). These approaches of using special characters to add formatting to one or more words of a composed message may be cumbersome and burdensome to users since the users may need to type additional text to add the desired emphasis in formatting to a message being composed and thus may undesirably impact the user experience.

In this regard, exemplary embodiments may utilize one or more keyboard/keypad shortcuts to format messages being composed for example with desired emphasis as well as may provide bulleted lists and numbered lists. By utilizing the exemplary embodiments, user experience with a user interface to compose messages may be enhanced since a user(s) may not need to take additional steps to manipulate the text itself (e.g., adding the "_" symbol around words to italicize the words, etc.) while the text of a message is being composed.

Applicant has identified that conserving memory space in memory devices as well as minimizing latency is important to improving any implementation of a group-based communication platform. Solutions that constrain memory capacity and increase latency may cause an undue burden on computational resources, which may negatively impact computing efficiency causing a slowdown or resource drain (e.g., diminishing bandwidth) on a network. Applicant has determined that some messaging application systems that apply formatting to text (e.g., bold text words, italicized words, etc.) composed within a message window display may store a structured object of a the formatted message being sent.

For instance, these messaging application systems may store a version of a message with the formatting of the message intact such as, for example, as a structured object with the formatted message intact (e.g., visual formatting (e.g., a visual formatted image) of the message is intact in like manner as the sent message (e.g., "What time are we leaving for the basketball game?"). In some messaging application systems that store a structured object of formatted messages, these messaging application systems may also store a version of the messages without the formatting, for example, stored in a search index to use only for searching.

There are technical drawbacks and problems to these approaches. For example, storing a version excluding the formatting for searching and a structured object format of the same message may constrain memory resources by increasing (e.g., doubling) the data storage corresponding to formatted messages sent by some messaging application systems and may increase query latency and consume computing resources (e.g., processing capacity) associated with searching for and/or evaluating respective messages as needed by having to search through inordinate amounts of data in memory. Network transmission latency may also be slowed as a structured object representing a formatted message (rather than a less transmit resource intensive plain text version) is often sent to various client devices so that such devices may respectively render the message at issue.

Example embodiments may store a version (e.g., a plain text version) of the messages without the formatting in a search index to use for searching. The exemplary embodiments may also render (e.g., display) formatted messages with the formatting intact, but then a network device(s) of the exemplary embodiments may convert the formatted messages back to their string format (e.g., plain text format) for storage in a memory (e.g., a database), at the network, according to the formatting language of the memory, without storing a structured object format of a same formatted message. By converting formatted messages back to their string format (e.g., plain text format) for storage in a memory (e.g., a database), at the network, according to the formatting language for the memory, exemplary embodiments may conserve memory capacity of memory devices (e.g., minimizing the data stored), conserve network processing resources and may reduce the latency of the network. Furthermore, by converting formatted messages back to their string format (e.g., plain text format) for storage in a memory at the network, exemplary embodiments may conserve the bandwidth of the network since the memory space of the memory devices is conserved by not storing structured object format messages (e.g., a visual formatted image message), which may require more data storage and consume more storage capacity and processing resources than required by plain text messages.

As such, systems structured in accordance with various embodiments of the invention provide specific, technical solutions to technical problems faced by some systems.

Definitions

As used herein, the terms "data," "content," "digital content," "digital content object," "information," and similar terms may be used interchangeably to refer to data capable of being transmitted, received, and/or stored in accordance with embodiments of the present invention. Thus, use of any such terms should not be taken to limit the spirit and scope of embodiments of the present invention. Further, where a computing device is described herein to receive data from another computing device, it will be appreciated that the data may be received directly from another computing device or may be received indirectly via one or more intermediary computing devices, such as, for example, one or more servers, relays, routers, network access points, base stations, hosts, and/or the like, sometimes referred to herein as a "network." Similarly, where a computing device is described herein to send data to another computing device, it will be appreciated that the data may be sent directly to another computing device or may be sent indirectly via one or more intermediary computing devices, such as, for example, one or more servers, relays, routers, network access points, base stations, hosts, and/or the like.

The terms "computer-readable storage medium" refers to a non-transitory, physical or tangible storage medium (e.g., volatile or non-volatile memory), which may be differentiated from a "computer-readable transmission medium," which refers to an electromagnetic signal.

The term "client device" refers to computer hardware and/or software that is configured to access a service made available by a server. The server is often (but not always) on another computer system, in which case the client device accesses the service by way of a network. Client devices may include, without limitation, smart phones, tablet computers, laptop computers, wearables, personal computers, enterprise computers, and the like.

"Group-based" is used herein to refer to a system, channel, message, or virtual environment that has security sufficient such that it is accessible only to a defined group of users. The group may be defined by common access credentials such as those of an organization or commercial enterprise. Access may further be facilitated by a validated request to join or an invitation to join transmitted by one group member user to another non-member user. Group identifiers (defined below) are used to associate data, information, messages, etc., with specific groups.

The term "group-based communication platform" refers to a collection of computing services that are accessible to one or more client devices, and that are operable to provide access to a plurality of software applications related to operations of databases. In some examples, the group-based communication platform may take the form of one or more central servers disposed in communication with one or more additional servers running software applications, and having access to one or more databases storing digital content items, application-related data, and/or the like. The group-based communication platform may also support client retention settings and other compliance aspects. Further, the group-based communication platform may provide comprehensive third party developer support that grants appropriate access to the data and allows third parties to build applications and bots to integrate with customer's workflows.

The term "group-based communication channel" refers to a virtual communications environment or feed that is configured to display messaging communications posted by channel members (e.g., validated users accessing the environment using client devices) that are viewable only to the members of the group. The format of the group-based communication channel may appear differently to different members of the group-based communication channel; however, the content of the group-based communication channel (i.e., messaging communications) will be displayed to each member of the group-based communication channel. For instance, a common set of group-based messaging communications will be displayed to each member of the respective group-based communication channel such that the content of the group-based communication channel (i.e., messaging communications) will not vary per member of the group-based communication channel.

The term "group-based communication channel data" refers to data items associated with communications between, and files shared by, channel members of a group-based communication channel.

The term "user" should be understood to refer to an individual, group of individuals, business, organization, and the like; the users referred to herein are accessing a group-based communication or messaging system using client devices.

The terms "user profile," "user account," and "user account details" refer to information associated with a user, including, for example, a user identifier, one or more group-based communication channel identifiers associated with group-based communication channels that the user has been granted access to, one or more group identifiers for groups with which the user is associated, an indication as to whether the user is an owner of any group-based communication channels, an indication as to whether the user has any group-based communication channel restrictions, a plurality of messages, a plurality of emojis, a plurality of conversations, a plurality of conversation topics, an avatar, an email address, a real name (e.g., John Doe), a username (e.g., jdoe), a password, a real name, a time zone, a status, and the like. The user account details can include a subset designation of user credentials, such as, for example, login information for the user including the user's username and password.

The terms "group-based communication channel identifier" or "channel identifier" refer to one or more items of data by which a group-based communication channel may be identified. For example, a group-based communication channel identifier may comprise American Standard Code for Information Interchange (ASCII) text, a pointer, a memory address, and the like.

The terms "group identifier" or "team identifier" refer to one or more items of data by which a group within a group-based communication system may be identified. For example, a group identifier may comprise ASCII text, a pointer, a memory address, and the like.

As used herein, the terms "messaging communication" and "message" refer to any electronically generated digital content object provided by a user using a client device and that is configured for display within a group-based communication channel. Message communications may include any text, image, video, audio or combination thereof provided by a user (using a client device). For instance, the user may provide a messaging communication that includes text as well as an image and a video within the messaging communication as message contents. In such a case, the text, image, and video would comprise the messaging communication or digital content object. Each message sent or posted to a group-based communication channel of the group-based communication system includes metadata comprising the following: a sending user identifier, a message identifier, message contents, a group identifier, and a group-based communication channel identifier. Each of the foregoing identifiers may comprise ASCII text, a pointer, a memory address, and the like.

The term "message communication data" refers to messages exchanged (direct messages (DMs) (e.g., messages sent by users directly to each other instead of through channels), reply messages, forwarded messages, etc.) between an apparatus (e.g., a client device) associated with a user account of a user and one or more other users of the group-based communication platform.

A "sending user identifier" is associated with a collection of messages that are sent by a particular user (i.e., a client device associated with the particular user). These messages may be analyzed to determine context regarding the user (e.g., the user's expertise or interest in a topic may be determined based on the frequency of mention of the topic or key words associated with the topic within such messages).

Group-based communication system users are organized into organization groups (e.g., employees of each company may be a separate organization group) and each organization group may have one or more group-based communication channels (explained below) to which users may be assigned or which the users may join (e.g., group-based communication channels may represent departments, geographic locations such as offices, product lines, user interests, topics, issues, and/or the like). A group identifier may be used to facilitate access control for a message (e.g., access to the message, such as having the message return as part of search results in response to a search query, may be restricted to those users having the group identifier associated with their user profile). The group identifier may be used to determine context for the message (e.g., a description of the group, such as the name of an organization and/or a brief description of the organization, may be associated with the group identifier).

Group-based communication system users may join group-based communication channels. Some group-based communication channels may be globally accessible to those users having a particular organizational group identifier associated with their user profile (i.e., users who are members of the organization). Access to some group-based communication channels may be restricted to members of specified groups, whereby the group-based communication channels are accessible to those users having a particular group identifier associated with their user profile. The group-based communication channel identifier may be used to facilitate access control for a message (e.g., access to the message, such as having the message return as part of search results in response to a search query, may be restricted to those users having the group-based communication channel identifier associated with their user profile, or who have the ability to join the group-based communication channel). The group-based communication channel identifier may be used to determine context for the message (e.g., a description of the group-based communication channel, such as a description of a project discussed in the group-based communication channel, may be associated with the group-based communication channel identifier).

The term "private group-based communication channel" refers to a group-based communication channel with restricted access such that it is not generally accessible and/or searchable by other members of the group-based communication system. For example, only those users or administrators who have knowledge of and permission to access (e.g., a group-based communication channel identifier for the private group-based communication channel is associated with their user profile after the user has been validated/authenticated) the private group-based communication channel may view content of the private group-based communication channel.

Figure 5:
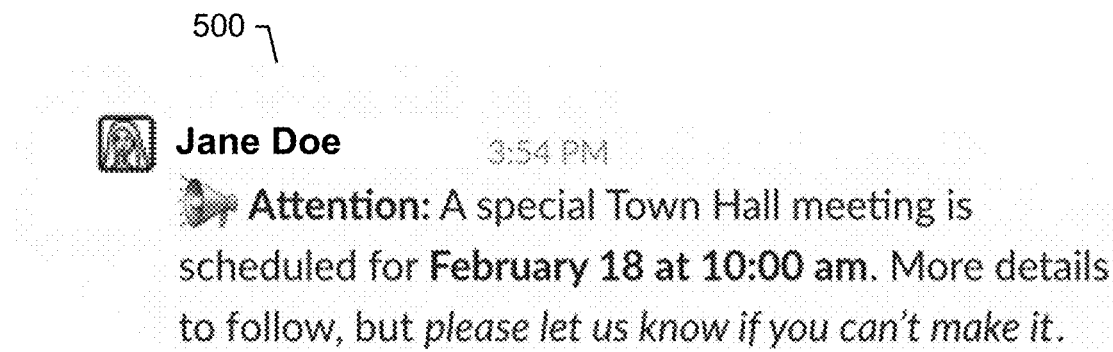
FIGS. 5-7 are diagrams of example user interfaces in accordance with some exemplary embodiments of the present invention.
Figure 6:
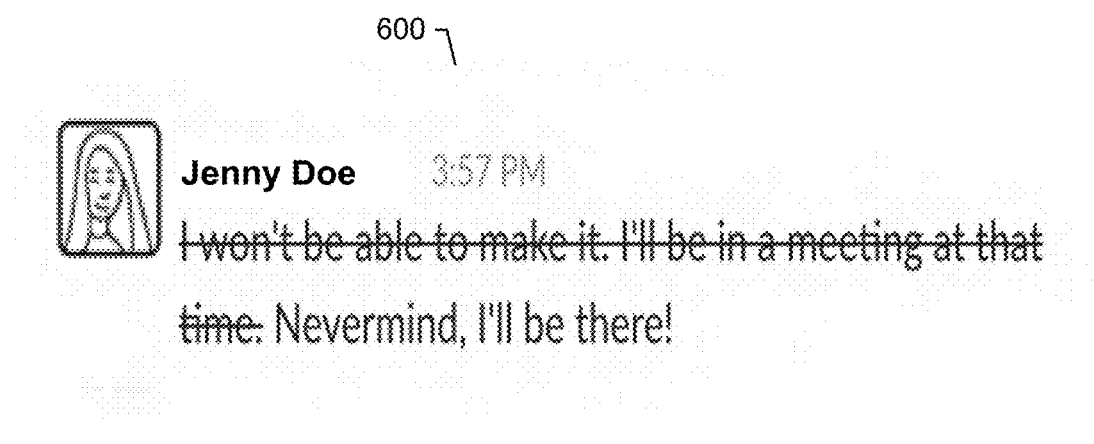
Figure 7:
Figure 7:

The term "messaging user interface" refers to a dedicated user interface for composing messages that are sent to one more client devices correlated to user accounts of users of the group-based communication system. For example, the messaging user interface 500, the messaging user interface 600 and the messaging user interface 700 of FIGS. 5-7 are examples of messaging user interfaces.

The term "plain text" or "plain text format" refers to text or characters of a message that excludes formatting (e.g., excludes bold, italics, underlining, strikethroughs, color, or other layout features (e.g., numbered lists, bulleted lists, etc.)) applied to the text/characters of the message itself.

The term "structured object format message" and/or structured message object refers to a message that includes formatting (e.g., includes bold, italics, underlining, strikethroughs, color, or other layout features (e.g., numbered lists, bulleted lists, etc.) of one or more characters or text of a formatted message and may include a graphical representation or one or more objects corresponding to the characters/text of the formatted message.

The term "respective assigned actions" refers to actions of the group-based communication system, associated with designated keys of a keyboard, including at least one of (i) bolding font of one or more of the characters, (ii) italicizing one or more of the characters, (iii) striking through one or more of the characters, (iv) adding a fixed-width to one or more of the characters, (v) creating a bullet list corresponding to at least a subset of the characters or (vi) creating a number list corresponding to at least a subset of the characters in a messaging user interface (e.g., messaging user interface 700).

The term "structured format trigger" refers to (i) a command string(s) identified within an input string (e.g., input within a group-based communication interface (e.g., the messaging user interface 700, etc.)) and/or (ii) an ordered list (e.g., a numbered/bulleted list) identified within the input string.

The term "structured format applied in response to identifying the structured format trigger" may include at least one of: i) bolding font of one or more characters of the input string, (ii) italicizing one or more characters of the input string, (iii) striking through one or more characters of the input string, (iv) applying a fixed-width to one or more characters of the input string, (v) creating a bullet list corresponding to an ordered list identified within the input string, or (vi) creating a number list corresponding to an ordered list identified within the input string.

The term "input string" may refer to one or more characters being input, for a message being composed, within a group-based communication interface (e.g., the messaging user interface 700, etc.). In one exemplary embodiment, at least a subset of the characters of the input string may correspond to special characters (e.g., the symbols "*" for bold text, "_" for italics, "~" for strikethrough, etc.) associated with code for adding formatting (e.g., bold, italics, strikethroughs, etc.) to corresponding characters of the input string. In another exemplary embodiment, at least a subset of the characters of the input string may be associated with (i) designated commands (e.g., designated shortcut keys of a keyboard) to format corresponding characters (e.g., according to the designated command(s)) and/or (ii) detected lists (e.g., ordered lists/numbered lists).

Example System Architecture

Methods, apparatuses, and computer program products of the present invention may be embodied by any of a variety of devices. For example, the method, apparatus, and computer program product of an example embodiment may be embodied by a networked device (e.g., an enterprise platform), such as a server or other network entity, configured to communicate with one or more devices, such as one or more client devices. Additionally or alternatively, the computing device may include fixed computing devices, such as a personal computer or a computer workstation. Still further, example embodiments may be embodied by any of a variety of mobile devices, such as a portable digital assistant (PDA), mobile telephone, smartphone, laptop computer, tablet computer, wearable, or any combination of the aforementioned devices.

FIG. 1 illustrates an example system architecture 100 within which embodiments of the present invention may operate. Users may access a group-based communication system 105 via a communications network 103 using client devices 101A-101N.

The client devices 101A-101N may be any computing device as defined above. Electronic data received by group-based communication system 105 from the client devices 101A-101N may be provided in various forms and via various methods. For example, the client devices 101A-

101N may include desktop computers, laptop computers, smartphones, netbooks, tablet computers, wearables, and the like.

In embodiments where a client device of client devices 101A-101N is a mobile device, such as a smart phone or tablet, the client device of client devices 101A-101N may execute an "app" to interact with the group-based communication system 105. Such apps are typically designed to execute on mobile devices, such as tablets or smartphones. For example, an app may be provided that executes on mobile device operating systems such as iOS®, Android®, or Windows®. These platforms typically provide frameworks that allow apps to communicate with one another and with particular hardware and software components of mobile devices. For example, the mobile operating systems named above each provide frameworks for interacting with location services circuitry, wired and wireless network interfaces, user contacts, and other applications.

Additionally or alternatively, the client device of client devices 101A-101N may interact with the group-based communication system 105 via a web browser. As yet another example, the client device of client devices 101A-101N may include various hardware or firmware designed to interface with the group-based communication system 105.

Communications network 103 may include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, etc.). For example, communications network 103 may include a cellular telephone, an 802.11, 802.16, 802.20, and/or WiMax network. Further, the communications network 103 may include a public network, such as the Internet, a private network, such as an intranet, or combinations thereof, and may utilize a variety of networking protocols now available or later developed including, but not limited to Transmission Control Protocol/Internet Protocol (TCP/IP) based networking protocols. For instance, the networking protocol may be customized to suit the needs of the group-based communication system. In some embodiments, the protocol is a custom protocol of JavaScript Object Notation (JSON) objects sent via a Websocket channel. In some embodiments, the protocol is JSON over RPC, JSON over REST/HTTP, and the like.

In some embodiments, the online data management system 107 comprises a group-based communication server 113, one or more databases 115, and an Application Programming Interface (API) component 117.

The group-based communication server 113 may be embodied as a computer or computers. The group-based communication server 113 may provide for receiving of electronic data from various sources, including but not limited to the client devices 101A-101N. For example, the group-based communication server 113 may be operable to receive and post or transmit group-based messaging communications provided by the client devices 101A-101N via communications network 103.

The API component 117 may be embodied in one or more computers or computing apparatus, such as a server or servers. The API component 117 may be a set of routines, protocols and software system tools that facilitate the data transmission among and between various components of the group-based communication system 105. For example, the API component 117 may receive queries from client devices 101A-101N via the communications network 103. It may also receive data from and transmit data to the group-based communication server 113. The API component 117 may also transmit data to the one or more databases 115.

Further, the API component 117 provides routines that allow a client to search for messages or message metadata. For example, the search.messages API component has a "query" field and performs a search given that query. It also allows for search of message metadata (for example, has: reaction or has:star, from:john).

The one or more databases 115 may be embodied as a data storage device(s) such as a Network Attached Storage (NAS) device or devices, or as a separate database server or servers. In some embodiments, the one or more databases 115 are relational database(s), such as MySQL database(s). The one or more databases 115 include information accessed and stored by the group-based communication server 113 and transmitted from API component 117, and facilitate the operations of the group-based communication server 113. For example, the one or more databases 115 may include, without limitation, a plurality of messaging communications organized among a plurality of group-based communication channels, and/or the like.

In this regard, the one or more databases 115 may serve as the primary data storage of the group-based communication system 105. As described hereinafter, the one or more databases 115 store backups (snapshots) of the data storage, and makes these backups available for index generation processes.

The index compiler 133 may process the metadata and/or contents of the message to index the message (e.g., using the conversation primitive as described below) and facilitate various facets of searching (i.e., search queries that return results from the group-based communication system 105). In one example embodiment, the message may be indexed such that a company's or a group's messages are indexed separately (e.g., in a separate index associated with the group and/or company that is not shared with other groups and/or companies). In another example embodiment, messages may be indexed at a separate distributed repository (e.g., to facilitate data isolation for security purposes).

An example of electronic information exchange among one or more client devices 101A-101N and the group-based communication system 105 is described below.

In some embodiments of an example group-based communication system 105, a message or messaging communication may be sent from a client device of client devices 101A-101N to a group-based communication system 105. In various implementations, the message may be sent to the group-based communication system 105 over communications network 103 directly by a client device of client devices 101A-101N. The message may be sent to the group-based communication system 105 via one or more intermediaries, such as group-based communication server 113, and/or the like. For example, client devices 101A-101N may be a desktop, a laptop, a tablet, a smartphone, and/or the like that is executing a client application (e.g., a group-based communication app).

In one implementation, the message may include data such as a message identifier, sending user identifier, a group identifier, a group-based communication channel identifier, message contents (e.g., text, emojis, images, links), attachments (e.g., files), message hierarchy data (e.g., the message may be a reply to another message), third party metadata, and/or the like. In one embodiment, the client device 101A-101N may provide the following example message, substantially in the form of a (Secure) Hypertext Transfer Protocol ("HTTP(S)") POST message including Extensible Markup Language ("XML") formatted data, as provided below:

```
POST /authrequest.php HTTP/1.1
Host: www.server.com
Content-Type: Application/XML
Content-Length: 667
<?XML version ="1.0" encoding = "UTF-8"?>
<auth_request>
    <timestamp>2020-12-31 23 :59:59</timestamp>
    <user_accounts_details>
        <user_account_credentials>
            <user_name>ID_user_1</user_name>
            <password>abc123</password>
            //OPTIONAL <cookie>cookieID</cookie>
            //OPTIONAL
<digital_cert_link>www.mydigitalcertificate.com/
JohnDoeDaDoeDoe@gmail.com/mycertifcate.dc</digital_cert_link>
            //OPTIONAL
<digital_certificate>_DATA_</digital_certificate>
        </user_account_credentials>
    </user_accounts_details>
    <client_details>//iOS Client with App and Webkit
        //it should be noted that although several client details
        //sections are provided to show example variants of
client
        //sources, further messages will include only on to
save
        //space
        <client_IP>10.0.0.123</client_IP>
        <user_agent_string>Mozilla/5.0 (iPhone; CPU iPhone OS
7_1_1 like Mac OS X) AppleWebKit/537.51.2 (KHTML, like Gecko)
Version/7.0 Mobile/11D201 Safari/9537.53</user_agent_string>
        <client_product_type>iPhone6,1</client_product_type>
        <client_serial_number>DNXXX1X1XXXX</client_serial_number>
        <client_UDID>3XXXXXXXXXXXXXXXXXXXXXXXXD</client_
UDID>
        <client_OS>iOS</client_OS>
        <client_OS_version>7.1.1</client_OS_version>
        <client_app_type>app with webkit</client_app_type>
        <app_installed_flag>true</app_installed_flag>
        <app_name>MSM.app</app_name>
        <app_version>1.0 </app_version>
        <app_webkit_name>Mobile Safari</client_webkit_name>
        <client_version>537.51.2</client_version>
    </client_details>
    <client_details> //iOS Client with Webbrowser
        <client_IP>10.0.0.123</client_IP>
        <user_agent_string>Mozilla/5.0 (iPhone; CPU iPhone OS
7_1_1 like Mac OS X) AppleWebKit/537.51.2 (KHTML, like Gecko)
Version/7.0 Mobile/11D201 Safari/9537.53</user_agent_string>
        <client_product_type>iPhone6,1</client_product_type>
        <client_serial_number>DNXXX1X1XXXX</client_serial_number>
        <client_UDID>3XXXXXXXXXXXXXXXXXXXXXXXXD</client_
UDID>
        <client_OS>iOS</client_OS>
        <client_OS_version>7.1.1</client_OS_version>
        <client_app_type>web browser</client_app_type>
        <client_name>Mobile Safari</client_name>
        <client_version>9537.53</client_version>
    </client_details>
    <client_details>//Android Client with Webbrowser
        <client_IP>10.0.0.123</client_IP>
        <user_agent_string>Mozilla/5.0 (Linux; U; Android 4.0.4; en-
us; Nexus S Build/IMM76D) AppleWebKit/534.30 (KHTML, like Gecko)
Version/4.0 Mobile Safari/534.30</user_agent_string>
        <client_product_type>Nexus S</client_product_type>
        <client_serial_number>YXXXXXXXX</client_serial_number>
        <client_UDID>FXXXXXXXXX-XXXX-XXXX-XXXX-
XXXXXXXXXXXXX</client_UDID>
        <client_OS>Android</client_OS>
        <client_OS_version>4.0.4</client_OS_version>
        <client_app_type>web browser</client_app_type>
        <client_name>Mobile Safari</client_name>
        <client_version>534.30</client_version>
    </client_details>
    <client_details>//Mac Desktop with Webbrowser
        <client_IP>10.0.0.123</client_IP>
        <user_agent_string>Mozilla/5.0 (Macintosh; Intel Mac OS X
10_9_3) AppleWebKit/537.75.14 (KHTML, like Gecko) Version/7.0.3
Safari/537.75.14</user_agent_string>
        <client_product_type>MacPro5,1</client_product_type>
        <client_serial_number>YXXXXXXXXZ</client_serial_number>
        <client_UDID>FXXXXXXXXX-XXXX-XXXX-XXXX-
XXXXXXXXXXXXX</client_UDID>
        <client_OS>Mac OS X</client_OS>
        <client_OS_version>10.9.3</client_OS_version>
        <client_app_type>web browser</client_app_type>
        <client_name>Mobile Safari</client_name>
        <client_version>537.75.14</client_version>
    </client_details>
    <message>
        <message_identifier>ID_message_10</message_identifier>
        <team_identifier>ID_team_1</team_identifier>
        <channel_identifier>ID_channel_1</channel_identifier>
        <contents>That is an interesting invention. I have attached a
copy our patent policy.</contents>
        <attachments>patent_policy.pdf</attachments>
    </message>
</auth_request>
```

The group-based communication system 105 comprises at least one group-based communication server 113 that may create a storage message based upon the received message to facilitate message storage in one or more databases 115. In one implementation, the storage message may include data such as a message identifier, a group identifier, a group-based communication channel identifier, a sending user identifier, topics, responses, message contents, attachments, message hierarchy data, third party metadata, conversation primitive data, and/or the like. For example, the group-based communication server 113 may provide the following example storage message, substantially in the form of a HTTP(S) POST message including XML-formatted data, as provided below:

```
POST /storage_message.php HTTP/1.1
Host: www.server.com
Content-Type: Application/XML
Content-Length: 667
<?XML version = "1.0" encoding = "UTF-8"?>
<storage_message>
    <message_identifier>ID_message_10</message_identifier>
    <team_identifier>ID_team_1</team_identifier>
    <channel_identifier>ID_channel_1</channel_identifier>
    <sending_user_identifier>ID_user_1</sending_user_identifier>
    <topics>
        <topic>inventions</topic>
        <topic>patents</topic>
        <topic>policies</topic>
    </topics>
    <responses>
        <response>liked by ID_user_2</response>
        <response>starred by ID_user_3</response>
    </responses>
    <contents>That is an interesting invention. I have attached
a copy our patent policy.</contents>
    <attachments>patent_policy.pdf</attachments>
    <conversation_primitive>
        conversation includes messages: ID_message_8,
ID_message_9, ID_message_10,
            ID_message_11, ID_message_12
    </conversation_primitive>
</storage_message>
```

In some embodiments, a group identifier as defined above may be associated with the message. In embodiments, a group-based communication channel identifier as defined above may be associated with the message. In some embodiments, a sending user identifier as defined above may be associated with the message. In one implementation, the message may be parsed (e.g., using Pre Hypertext Processor (PHP) commands) to determine a sending user identifier of the user who sent the message.

In some embodiments, topics may be associated with the message. In one implementation, the message contents may be parsed (e.g., using PHP commands) to determine topics discussed in the message. For example, hashtags in the message may indicate topics associated with the message. In another example, the message may be analyzed (e.g., by itself, with other messages in a conversation primitive) or parsed using a machine learning technique, such as topic modeling, to determine topics associated with the message.

In some embodiments, data indicating responses may be associated with the message. For example, responses to the message by other users may include reactions (e.g., selection of an emoji associated with the message, selection of a "like" button associated with the message), clicking on a hyperlink embedded in the message, replying to the message (e.g., posting a message to the group-based communication channel in response to the message), downloading a file associated with the message, sharing the message from one group-based communication channel to another group-based communication channel, pinning the message, starring the message, and/or the like. In one implementation, data regarding responses to the message by other users may be included with the message, and the message may be parsed (e.g., using PHP commands) to determine the responses. In another implementation, data regarding responses to the message may be retrieved from a database. For example, data regarding responses to the message may be retrieved via a MySQL database command similar to the following:

SELECT messageResponses
FROM MSM_Message
WHERE messageID=ID_message_10.

As described further hereinafter, the above MySQL database command may be modified and used to generate documents for live or computed indexing (via MySQL queries for live indexing in the API component 117.

For example, data regarding responses to the message may be used to determine context for the message (e.g., a social score for the message from the perspective of some user). In another example, data regarding responses to the message may be analyzed to determine context regarding the user (e.g., the user's expertise in a topic may be determined based on the responses to the user's message regarding the topic).

In some embodiments, attachments may be included with the message. If there are attachments, files may be associated with the message. In one implementation, the message may be parsed (e.g., using PHP commands) to determine file names of the attachments. For example, file contents may be analyzed to determine context for the message (e.g., a patent policy document may indicate that the message is associated with the topic "patents").

In some embodiments, third party metadata may be associated with the message. For example, third party metadata may provide additional context regarding the message or the user that is specific to a company, group, group-based communication channel, and/or the like. In one implementation, the message may be parsed (e.g., using PHP commands) to determine third party metadata. For example, third party metadata may indicate whether the user who sent the message is an authorized representative of the group-based communication channel (e.g., an authorized representative may be authorized by the company to respond to questions in the group-based communication channel).

In some embodiments, a conversation primitive may be associated with the message. In one implementation, a conversation primitive is an element used to analyze, index, store, and/or the like messages. For example, the message may be analyzed by itself, and may form its own conversation primitive. In another example, the message may be analyzed along with other messages that make up a conversation, and the messages that make up the conversation may form a conversation primitive. In one implementation, the conversation primitive may be determined as the message, a specified number (e.g., two) of preceding messages and a specified number (e.g., two) of following messages. In another implementation, the conversation primitives may be determined based on analysis of topics discussed in the message and other messages (e.g., in the channel) and/or proximity (e.g., message send order proximity, message send time proximity) of these messages. The conversation primitives are also used for shingling and searching over conversations (the messages and their surrounding messages).

In some embodiments, various metadata (determined as described above) and the contents of the message are transmitted from the client devices 101A-101N to the group-based communication system 105 via the communications network 103.

Upon receiving electronic message data from the client devices 101A-101N via communications network 103, the group-based communication server 113 processes and prioritizes electronic message data. The group-based communication server 113 provides persistent broadcast of electronic messages to the client devices 101A-101N connected to the group-based communication system 105 via the communications network 103. For example, when a user John sends an electronic message in a group-based communication channel using a client device, the group-based communication server 113 broadcasts this electronic message to other client devices associated with the same group-based communication channel. In this regard, the group-based communication server 113 serves as a message amplifier.

The group-based communication server 113 also communicates with the API component 117 to initiate the process of writing electronic message data into the one or more databases 115.

Example Apparatuses Utilized with Various Embodiments

Figure 2:
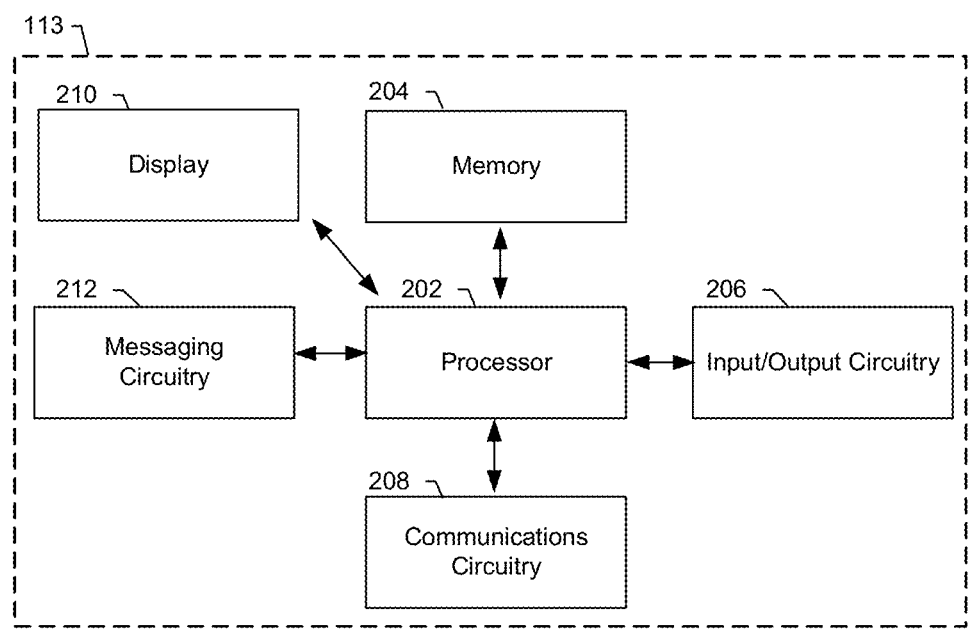
FIG. 2 is a diagram of an apparatus of a group-based communication server in accordance with some exemplary embodiments of the present invention.

The group-based communication server 113 may be embodied by one or more computing systems, such as apparatus 200 shown in FIG. 2. The apparatus 200 may include processor 202, memory 204, input/output circuitry 206, communications circuitry 208, display 210 and messaging circuitry 212. The apparatus 200 may be configured to execute the operations described herein. Although these components 202-212 are described with respect to functional limitations, it should be understood that the particular implementations necessarily include the use of particular hardware. It should also be understood that certain of these components 202-212 may include similar or common hardware. For example, two sets of circuitries may both leverage use of the same processor, network interface, storage medium, or the like to perform their associated functions, such that duplicate hardware is not required for each set of circuitries.

In some embodiments, the processor 202 (and/or co-processor or any other processing circuitry assisting or otherwise associated with the processor) may be in communication with the memory 204 via a bus for passing information among components of the apparatus. The memory 204 is non-transitory and may include, for example, one or more volatile and/or non-volatile memories. In other words, for example, the memory 204 may be an electronic storage device (e.g., a computer-readable storage medium). The memory 204 may be configured to store information, data, content, applications, instructions, or the like for enabling the apparatus to carry out various functions in accordance with example embodiments of the present invention.

The processor 202 may be embodied in a number of different ways and may, for example, include one or more processing devices configured to perform independently. In some preferred and non-limiting embodiments, the processor 202 may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In some preferred and non-limiting embodiments, the processor 202 may be configured to execute instructions stored in the memory 204 or otherwise accessible to the processor 202. In some preferred and non-limiting embodiments, the processor 202 may be configured to execute hard-coded functionalities. As such, whether configured by hardware or software methods, or by a combination thereof, the processor 202 may represent an entity (e.g., physically embodied in circuitry) capable of performing operations according to an embodiment of the present invention while configured accordingly. Alternatively, as another example, when the processor 202 is embodied as an executor of software instructions, the instructions may specifically configure the processor 202 to perform the algorithms and/or operations described herein when the instructions are executed.

In some embodiments, the apparatus 200 may include input/output circuitry 206 that may, in turn, be in communication with processor 202 to provide output to the user and, in some embodiments, to receive an indication of a user input. The input/output circuitry 206 may comprise a user interface and may include a display, and may comprise a web user interface, a mobile application, a client device, a kiosk, or the like. In some embodiments, the input/output circuitry 206 may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 204, and/or the like).

The communications circuitry 208 may be any means such as a device or circuitry embodied in either hardware or a combination of hardware and software that is configured to receive and/or transmit data from/to a network and/or any other device, circuitry, or module in communication with the apparatus 200. In this regard, the communications circuitry 208 may include, for example, a network interface for enabling communications with a wired or wireless communication network. For example, the communications circuitry 208 may include one or more network interface cards, antennae, buses, switches, routers, modems, and supporting hardware and/or software, or any other device suitable for enabling communications via a network. Additionally or alternatively, the communications circuitry 208 may include the circuitry for interacting with the antenna/antennae to cause transmission of signals via the antenna/antennae or to handle receipt of signals received via the antenna/antennae.

The messaging circuitry 212 includes hardware configured to receive one or more string format messages from a client device(s) that converted the string format message from a corresponding formatted message and may store the string format message in the formatting language of a memory device (e.g., memory 204), as described more fully below. The messaging circuitry 212 may utilize processing circuitry, such as the processor 202, to perform these actions. However, it should also be appreciated that, in some embodiments, the messaging circuitry 212 may include a separate processor, specially configured Field Programmable Gate Array (FPGA), or Application Specific Integrated Circuit (ASIC) for performing the functions described herein. The messaging circuitry 212 may be implemented using hardware components of the apparatus configured by either hardware or software for implementing these planned functions.

It is also noted that all or some of the information discussed herein can be based on data that is received, generated and/or maintained by one or more components of apparatus 200. In some embodiments, one or more external systems (such as a remote cloud computing and/or data storage system) may also be leveraged to provide at least some of the functionality discussed herein.

Figure 3:
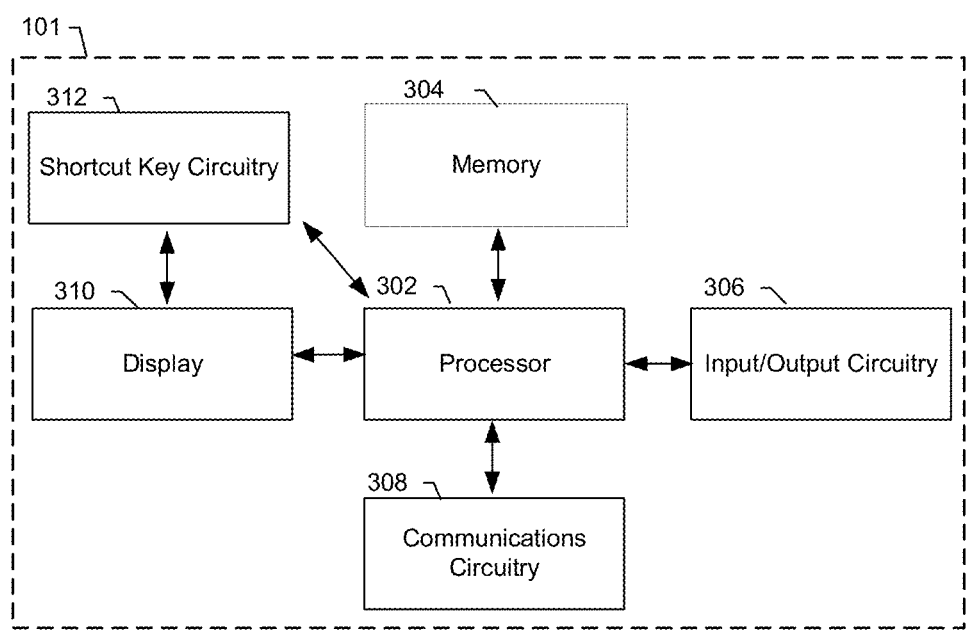
FIG. 3 is a diagram of an apparatus of a client device in accordance with some exemplary embodiments of the present invention.

Referring now to FIG. 3, a client device(s) 101 (e.g., client devices 101A-101N) may be embodied by one or more computing systems, such as apparatus 300 shown in FIG. 3. The apparatus 300 may include processor 302, memory 304, input/output circuitry 306, communications circuitry 308, display 310 and shortcut key circuitry 312. Although these components 302-312 are described with respect to functional limitations, it should be understood that the particular implementations necessarily include the use of particular hardware. It should also be understood that certain of these components 302-312 may include similar or common hardware. For example, two sets of circuitries may both leverage use of the same processor, network interface, storage medium, or the like to perform their associated functions, such that duplicate hardware is not required for each set of circuitries.

In some embodiments, the processor 302 (and/or co-processor or any other processing circuitry assisting or otherwise associated with the processor) may be in communication with the memory 304 via a bus for passing information among components of the apparatus. The memory 304 is non-transitory and may include, for example, one or more volatile and/or non-volatile memories. In other words, for example, the memory 304 may be an electronic storage device (e.g., a computer-readable storage medium). The memory 304 may include one or more databases. Furthermore, the memory 304 may be configured to store information, data, content, applications, instructions, or the like for enabling the apparatus 300 to carry out various functions in accordance with example embodiments of the present invention.

The processor 302 may be embodied in a number of different ways and may, for example, include one or more processing devices configured to perform independently. In some preferred and non-limiting embodiments, the processor 302 may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In some preferred and non-limiting embodiments, the processor 302 may be configured to execute instructions stored in the memory 304 or otherwise accessible to the processor 302. In some preferred and non-limiting embodiments, the processor 302 may be configured to execute hard-coded functionalities. As such, whether configured by hardware or software methods, or by a combination thereof, the processor 302 may represent an entity (e.g., physically embodied in circuitry) capable of performing operations according to an embodiment of the present invention while configured accordingly. Alternatively, as another example, when the processor 302 is embodied as an executor of software instructions (e.g., computer program instructions), the instructions may specifically configure the processor 302 to perform the algorithms and/or operations described herein when the instructions are executed.

In some embodiments, the apparatus 300 may include input/output circuitry 306 that may, in turn, be in communication with processor 302 to provide output to the user and, in some embodiments, to receive an indication of a user input. The input/output circuitry 306 may comprise a user interface and may include a display, and may comprise a web user interface, a mobile application, a client device, a kiosk, or the like. In some embodiments, the input/output circuitry 306 may also include a keyboard (e.g., also referred to herein as keypad), a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 304, and/or the like).

The communications circuitry 308 may be any means such as a device or circuitry embodied in either hardware or a combination of hardware and software that is configured to receive and/or transmit data from/to a network and/or any other device, circuitry, or module in communication with the apparatus 300. In this regard, the communications circuitry 308 may include, for example, a network interface for enabling communications with a wired or wireless communication network. For example, the communications circuitry 308 may include one or more network interface cards, antennae, buses, switches, routers, modems, and supporting hardware and/or software, or any other device suitable for enabling communications via a network. Additionally or alternatively, the communications circuitry 308 may include the circuitry for interacting with the antenna/antennae to cause transmission of signals via the antenna/antennae or to handle receipt of signals received via the antenna/antennae.

The shortcut key circuitry 312 includes hardware configured to invoke one or more executable commands to perform a message formatting action(s) (e.g., bolding text, italicizing text, generating bulleted lists, generating numbered lists, etc.) in a messaging user interface in response to detection of one or more designated keys of a keyboard being depressed, as described more fully below. In some exemplary embodiments, the shortcut key circuitry 312 may detect one or more depressions of designated keys of a keyboard in sequence one after the other or simultaneously to invoke a corresponding messaging formatting action(s).

The shortcut key circuitry 312 may also parse the text of a formatted message (e.g., a message with one or more italicized words (e.g., "Do you want to workout in the morning ?), etc.) and in response to the formatted message being sent to a recipient, the shortcut key circuitry 312 may convert the formatted message to a string format message (e.g., a plain text format message) that excludes the formatting (e.g., "Do you want to workout_in the morning_?), etc.) according to a formatting language of a storage device, as described more fully below. The shortcut key circuitry 312 may send the string format message to the group-based communication server 113 to enable the group-based communication server 113 to store the string format message in the functional language of a memory device (e.g., memory 204).

The shortcut key circuitry 312 may utilize processing circuitry, such as the processor 302, to perform these actions. However, it should also be appreciated that, in some embodiments, the shortcut key circuitry 312 may include a separate processor, specially a configured Field Programmable Gate Array (FPGA), or Application Specific Integrated Circuit (ASIC) for performing the functions described herein. The shortcut key circuitry 312 may be implemented using hardware components of the apparatus configured by either hardware or software for implementing these planned functions.

It is also noted that all or some of the information discussed herein can be based on data that is received, generated and/or maintained by one or more components of apparatus 300. In some embodiments, one or more external systems (such as a remote cloud computing and/or data storage system) may also be leveraged to provide at least some of the functionality discussed herein.

The term "circuitry" should be understood broadly to include hardware and, in some embodiments, software for configuring the hardware. With respect to components of the apparatus, the term "circuitry" as used herein should therefore be understood to include particular hardware configured to perform the functions associated with the particular circuitry as described herein. For example, in some embodiments, "circuitry" may include processing circuitry, storage media, network interfaces, input/output devices, and the like. In some embodiments, other elements of the apparatus 200 may provide or supplement the functionality of particular circuitry. For example, the processor 202 may provide processing functionality, the memory 204 may provide storage functionality, the communications circuitry 208 may provide network interface functionality, and the like. Similarly, other elements of the apparatus 300 may provide or supplement the functionality of particular circuitry. For example, the processor 302 may provide processing functionality, the memory 304 may provide storage functionality, the communications circuitry 308 may provide network interface functionality, and the like.

As will be appreciated, any such computer program instructions (e.g., program code instructions) and/or other type of code may be loaded onto a computer, processor or other programmable apparatus's circuitry to produce a machine, such that the computer, processor or other programmable circuitry that execute the code on the machine creates the means for implementing various functions, including those described herein.

As described above and as will be appreciated based on this disclosure, embodiments of the present invention may be configured as methods, mobile devices, backend network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Any suitable computer-readable storage medium may be utilized including non-transitory hard disks, CD-ROMs, flash memory, optical storage devices, or magnetic storage devices.

Example Data Flows

As mentioned, various exemplary embodiments format messages in a messaging user interface of a group-based communication system based in part on utilizing one or more keyboard shortcuts and storing the messages in a storage device based in part on the formatting language of the storage device. In this manner, the exemplary embodiments may not need to utilize special characters in all instances (e.g., "*" for bold text, "_" for italics, "~" for strikethrough, etc.) to put emphasis on words and/or to create numbered lists and bulleted lists of a message being composed in a user interface of a messaging application.

In an exemplary embodiment, the processor (e.g., processor 302) of a client device (e.g., client device 101) may generate a user interface such as, for example, a messaging user interface for a user to compose one or more messages to be sent from the client device to one or more other client devices (e.g., client devices 101A-101N) of other users in response to invoking a client application such as, for example, a messaging application (e.g., a messaging application of a group-based communication app).

In this regard, in some example embodiments, the processor (e.g., processor 302) of a client device (e.g., client device 101) may detect text of a message being composed in a messaging user interface and may detect an indication of a selection of text (e.g., selected via a mouse, a pointer (e.g., a stylus, a finger or the like)) of a touch screen of the messaging user interface, etc.) and in response to detection of a depression of one or more corresponding designated shortcut keys of a keyboard, the shortcut key circuitry 312 may format the text of the message according to the actions that correspond to the depressed designated shortcut keys.

Referring now to FIG. 4, a diagram is provided illustrating one or actions that may be performed on messages being composed in a messaging user interface based in part on detection of designated shortcut key combinations being pressed on a keyboard as well as detection of ordered lists, as described more fully below.

For example, in an instance in which text of a message being composed is selected from the messaging user interface and the shortcut key circuitry 312 detects that the designated shortcut key "command" ("cmd") and designated shortcut key "b" (e.g., cmd+b) are depressed one after another in sequence or simultaneously, the shortcut key circuitry 312 may format the selected text to bold the selected text of a formatted message. In some alternative exemplary embodiments, a designated shortcut key "control" ("CTRL") may be utilized as a substitute for the designated shortcut cmd key for each of the designated shortcut key combinations, of FIG. 4 and described herein, that include a designated shortcut cmd key.

Furthermore, in an instance in which text of a message being composed is selected from the messaging user interface and the shortcut key circuitry 312 detects that the designated shortcut key "cmd", the designated shortcut key "shift" and the designated shortcut key "x" (e.g., cmd+shift+x) are depressed one after another in sequence or simultaneously, the shortcut key circuitry 312 may format the selected text to strikethrough the selected text of a formatted message.

In an instance in which text of a message being composed is selected from the messaging user interface and the shortcut key circuitry 312 detects that the designated shortcut key "cmd", the designated shortcut key "shift" and the designated shortcut key "c" (e.g., cmd+shift+c) are depressed one after another in sequence or simultaneously, the shortcut key circuitry 312 may format the selected text to display the selected text as fixed-width code of a formatted message. In this regard, the messaging user interface may display the fixed-width text along with other text of the formatted message.

In an exemplary embodiment, in response to a message being composed with emphasis added, in the messaging user interface, to the text such as, for example, bold font, italic font, a strikethrough(s) and/or fixed-width code, the processor (e.g., processor 302) and/or the shortcut key circuitry (e.g., shortcut key circuitry 312) of a client device (e.g., client device 101) may parse the formatted text and convert the corresponding message to its string format (e.g., plain text form of a formatted message) and send the string format of the message to the group-based communication server 113 for storage in a memory device (e.g., memory 204) according to the formatting language (e.g., string format) of the memory device (e.g., memory 204), as described more fully below.

In some other example embodiments, quote blocks in a message being composed within a messaging user interface may be generated by the group-based communication server 113 based in part on detection of designated shortcut key combinations being pressed on a keyboard. For example, in an instance in which text of a message being composed is selected from the messaging user interface and the shortcut key circuitry 312 detects that the designated shortcut key "cmd", the designated shortcut key "shift" and the designated shortcut key ">" (e.g., cmd+shift+>) are depressed one after another in sequence or simultaneously, the shortcut key circuitry 312 may format the selected text to display the selected text by inserting the symbol ">" at the start of each line of the selected text denoting a quoted section/block.

Referring now to FIG. 5, an exemplary messaging user interface is provided according to an exemplary embodiment. In the example of FIG. 5, a message such as for example "Attention: A special Town Hall meeting is scheduled for Feb. 18 at 10:00 a.m. More details to follow, but pleae let us know if you can't make it" is being composed in the messaging user interface 500 displayed via a display device (e.g., display 310). As shown in FIG. 5, the message of the messaging user interface 500 has bold font added to the word "Attention" and the words "February 18th at 10:00 am" by detecting a prior selection of these words and detecting depression of the designated shortcut key "cmd" and the designated shortcut key "b" (e.g., cmd+b) in the manner described above.

Additionally, as shown in FIG. 5, the message of the messaging user interface 500 has italicized font added to the words "please let us know if you can't make it" by detecting a prior selection of these words and detecting depression of the designated shortcut key "cmd" and the designated shortcut key "i" (e.g., cmd+i) in the manner described above. In response to the message being sent, by the processor (e.g., processor 302), to one or more client devices (e.g., client devices 101A-101N) of one or more other users (e.g., one or more users of a group-based communication channel, etc.), the processor (e.g., processor 302) and/or the shortcut key circuitry (e.g., shortcut key circuitry 312) may parse the text of the message and convert the formatted message to its string format (e.g. plain text format) for formatted messages and may send the string format of the message to the group-based communication server 113 to store the message in a memory device (e.g., memory 204) according to the formatting language (e.g., string format message) of the memory device (e.g., memory 204). In this manner, the processor (e.g., processor 302) of a client device (e.g., client device 101) may not generate and may not send to the group-based communication server 113, a structured object format of the formatted message "Attention: A special Town Hall meeting is scheduled for Feb. 18 at 10:00 a.m.. More details to follow, but please let us know if you can't make it". In the example of FIG. 5, the string format may be "*Attention*: A special Town Hall meeting is scheduled for *February 18 at 10:00 am*. More details to follow, but please let us know if you can't make it." in a plain text only format (e.g., excluding the formatting).

Referring now to FIG. 6, another exemplary messaging user interface is provided according to an exemplary embodiment. In the example of FIG. 6, a message such as for example ". Nevermind, I'll be there!" is being composed in the messaging user interface 600 displayed via a display device (e.g., display 310). As shown in FIG. 6, the message of the messaging user interface 500 has words such as "I won't be able to make it. I'll be in a meeting at that time" struck through by detecting a prior selection of these words and detecting depression of the designated shortcut key "cmd", the designated shortcut key "shift" and the designated shortcut key "x" (e.g., cmd+shift+x) in the manner described above.

In response to the message being sent by the processor (e.g., processor 302) to one or more other client devices (e.g., client devices 101A-101N) of one or more other users (e.g., one or more users of a group-based communication channel, etc.), the processor (e.g., processor 302) and/or the shortcut key circuitry (e.g., shortcut key circuitry 312) may parse the text of the message and convert the formatted message to its string format (e.g. plain text format) for formatted messages and may send the string format of the message to the group-based communication server 113 to store, via messaging circuitry 212, the message in a memory device (e.g., memory 204) according to the formatting language (e.g., string format message) of the memory device (e.g., memory 204). In this regard, the processor (e.g., processor 302) of a client device (e.g., client device 101) may not generate and may not send to the group-based communication server 113, a structured object format of the formatted message ". Nevermind, I'll be there!" In the example of FIG. 6, the string format may be "~I won't be able to make it. I'll be in a meeting at that time.~Nevermind, I'll be there!" in a plain text only format (e.g., excluding the formatting).

Furthermore, in an instance in which a processor (e.g., processor 202) and/or the shortcut key circuitry (e.g., shortcut key circuitry 312) of a client device (e.g., client device 101) detects text/characters of a message, by parsing the text/characters of the message being composed in a messaging user interface, and determining that the text/characters includes a list (e.g., a message typed with dashes (e.g., "When you go to the grocery store will you pick up—apples,—a can of soup,—a case of soda, and—a gallon of milk?") the shortcut key circuitry 312 may convert the list into a numbered list (e.g., "When you go to the grocery store will you pick up 1) apples, 2) a can of soup, 3) a case of soda, and 4) a gallon of milk?") in response to an indication of selection of the text/characters including the list and detecting depression of the designated shortcut key "cmd", the designated shortcut key "shift" and the designated shortcut key "7" (e.g., cmd+shift+7) one after another in sequence or simultaneously.

As another example, in an instance in which a processor (e.g., processor 202) of a client device (e.g., client device 101) detects text/characters of a message, by parsing the text of the message being composed in a messaging user interface, and determining that the text/characters includes a list (e.g., a message typed with dashes (e.g., "When you go to the grocery store will you pick up—apples,—a can of soup,—a case of soda, and—a gallon of milk?") the shortcut key circuitry 312 may convert the list into a bulleted list (e.g., "When you go to the grocery store will you pick up •apples, •a can of soup, •a case of soda, and •a gallon of milk?") in response to an indication of selection of the text/characters including the list and detecting depression of the designated shortcut key "cmd", the designated shortcut key "shift" and the designated shortcut key "8" (e.g., cmd+shift+8) one after another in sequence or simultaneously.

In an instance in which a processor (e.g., processor 202) of a client device (e.g., client device 101) detects insertion of a bullet character (e.g., "•"), a dash character ("-") or an asterisk character (e.g., "*") and some text being composed in a message of a messaging user interface, in an instance in which the shortcut key circuitry 312 detects depression of the designated shortcut key "cmd", the designated shortcut key "shift" and the designated shortcut key "8" ((e.g., cmd+shift+8)) one after another in sequence or simultaneously, the shortcut key circuitry 312 may insert a new line with a bullet or dash of a message being composed each instance in which an enter key is subsequently detected as being depressed.

In some other exemplary embodiments, in an instance in which a processor (e.g., processor 202) of a client device (e.g., client device 101) detects a line or sentence, by parsing the line/sentence, beginning with a bullet character (e.g., "•"), a dash character (e.g., "-") or an asterisk character (e.g., "*") of characters of a message being composed in a messaging user interface, in an instance in which the shortcut key circuitry 312 detects depression of an enter or return key, the shortcut key circuitry 312 may determine that a subset of the characters correspond to an ordered list and may insert a new line with a corresponding bullet, dash or asterisk character in the message being composed each instance in which the enter or return key is subsequently detected as being depressed to automatically generate a bulleted list (e.g., until the bulleted list is deactivated, for example, by deleting a bullet/dash in a most recent entered line of the message being composed). In this manner, the shortcut key circuitry 312 may assist a client device (e.g., client device 101) of a user composing the message in automatically generating the bulleted list.

In an instance in which a processor (e.g., processor 202) of a client device (e.g., client device 101) detects a line or sentence, by parsing the line/sentence, beginning with a number (e.g., 1., 1), etc.) of characters of a message being composed in a messaging user interface, in an instance in which the shortcut key circuitry 312 detects depression of an enter or return key, the shortcut key circuitry 312 may determine that a subset of the characters correspond to an ordered list and may insert a new line with a corresponding subsequent number (e.g., 2., 2), etc.) of the message being composed each instance in which the enter or return key is subsequently detected as being depressed to automatically generate a numbered list (e.g., until the numbered list is deactivated, for example, by deleting a number in a most recent entered line of the message being composed). In this regard, the shortcut key circuitry 312 may assist a client device (e.g., client device 101) of a user composing the message in automatically generating the numbered list.

In some other example embodiments, quoted lists in a message being composed within a messaging user interface may be generated by the group-based communication server 113 based in part on detection of designated shortcut key combinations being pressed on a keyboard. For example, in an instance in which the group-based communication server 113 detects a list (e.g., a bullet list, a numbered list), in the manner described above, with text typed in the list, being composed in the messaging user interface, such as, for example >•and a first item (e.g., >•item one) or >1. and a first item (e.g., >1 item one) or alternatively >1) and a first item (e.g., >1) item one), in response to the shortcut key circuitry 312 detecting that the designated shortcut key "shift", and the designated shortcut key "enter" (e.g., shift+enter) are depressed one after another in sequence or simultaneously, the shortcut key circuitry 312 may format the list to display the symbol >at the start of each new line to denote a quoted list for each new line.

Referring now to FIG. 7, yet another exemplary messaging user interface is provided according to an exemplary embodiment. In the example of FIG. 7, a processor (e.g., processor 302) and/or shortcut key circuitry (e.g., shortcut key circuitry 312) of a client device (e.g., client device 101) parsed characters of a message being composed in the messaging user interface 700 displayed via a display device (e.g., display 310) and determined that an ordered list was being composed. As shown in FIG. 7, the message of the messaging user interface 700 has bold font added to the words "Here's the agenda:" by detecting a prior selection of these words and detecting depression of the designated shortcut key "cmd" and the designated shortcut key "b" (e.g., cmd+b). Further, in the example of FIG. 7 consider that the initial message being composed was "Here's the agenda:—New company-wide vacation policy.—2017 Bonus updates.—Quarterly hiring goals. Cookies with be provided!" In response to parsing the words of the message, the processor (e.g., processor 302) and/or the shortcut key circuitry (e.g., shortcut key circuitry 312) detected the ordered list and converted the list to a numbered list such that the message in the messaging user interface 700 consists of "Here's the agenda: 1. New company-wide vacation policy. 2. 2017 Bonus updates. 3. Quarterly hiring goals. Cookies with be provided!" In this example, the shortcut key circuitry 312 may detect the ordered list in response to parsing the characters and determining that at least a subset of the characters of the message denote sequential items (e.g., "—New company-wide vacation policy.—2017 Bonus updates.—Quarterly hiring goals") of a list.

In response to the message of messaging user interface 700 being sent by the processor (e.g., processor 302) to one or more client devices (e.g., client devices 101A-101N) of one or more other users (e.g., one or more users of a group-based communication channel, a direct message (DM) to a client device of a user, etc.), the processor (e.g., processor 302) may parse the text of the message and convert the formatted message to its string format (e.g. plain text format) for formatted messages and may send the string format of the message to the group-based communication server 113 to store, via the messaging circuitry 212, the message in a memory device (e.g., memory 204) according to the formatting language (e.g., string format message) of the memory device (e.g., memory 204). In the example of FIG. 7, the string format may be "Here's the agenda:—New company-wide vacation policy.—2017 Bonus updates.—Quarterly hiring goals. Cookies with be provided!" in a plain text only format. In exemplary embodiments, the processor (e.g., processor 302) of a client device (e.g., client device 101) may not generate and may not send to the group-based communication server 113, a structured object format of the formatted message "Here's the agenda: 1. New company-wide vacation policy. 2. 2017 Bonus updates. 3. Quarterly hiring goals. Cookies with be provided!" As such, the group-based communication server 113 may not store in a memory (e.g., memory 204) a structured object format of the formatted message.

Figure 8:
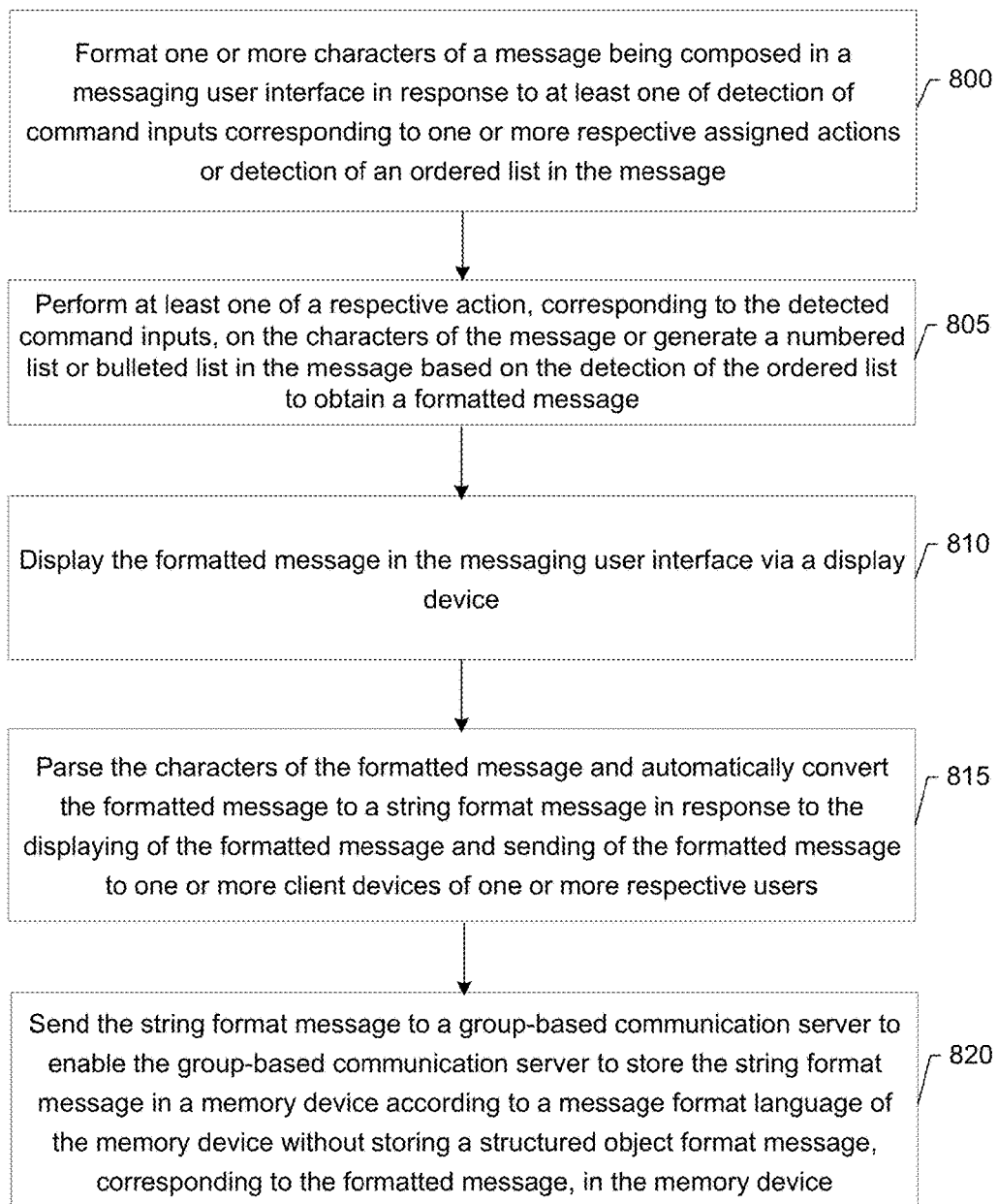
FIG. 8 is an example flowchart illustrating example methods in accordance with some embodiments of the present invention.

Referring now to FIG. 8, an example embodiment of a flowchart for formatting a message(s) being composed in a group-based communication system according to an example embodiment is provided. At operation 800, an apparatus (e.g., client device 101) may format one or more characters of a message being composed in a messaging user interface (e.g., messaging user interface 700) in response to at least one of detection of one or more command inputs (e.g., depressed designated keys (e.g., cmd+b, cmd+i, cmd+shift+x, cmd+shift+c, cmd+shift+7, cmd+shift+8) of a keyboard of the apparatus) corresponding to one or more respective assigned actions (e.g., bold font of one or more characters, italicize font of one or more characters, strikethrough one or more characters, assign a fixed width to one or more of the characters, generate a numbered list/bulleted list at least a subset of the characters, etc.) or detection of an ordered list in the message. At operation 805, an apparatus (e.g., client device 101) may perform at least one of a respective action (e.g., bold font of one or more characters), corresponding to the one or more detected command inputs (e.g., cmd+b), on the characters of the message or generate a numbered list or bulleted list in the message based on the detection of the ordered list to obtain a formatted message.

At operation 810, an apparatus (e.g., client device 101) may display the formatted message in the messaging user interface (e.g., messaging user interface 700) via a display device (e.g., display 310). At operation 815, an apparatus (e.g., client device 101) may parse the characters of the formatted message and automatically convert the formatted message to a string format message in response to displaying the formatted message and sending the formatted message to one or more client devices (e.g., client devices 101A-101N) of one or more respective users. At operation 820, an apparatus (e.g., client device 101) may send the string format message to a server (e.g., group-based communication server 113) to enable the server (e.g., group-based communication server 113) to store the string format message in a memory device (e.g., memory 204) according to a message format language of the memory device (e.g., memory 204) without storing a structured object format message, corresponding to the formatted message, in the memory device (e.g., memory 204). The structured object format message may include formatted characters having some emphasis added (e.g., bold font, italicized font, struck through characters, assigned fixed width characters) and/or a numbered/bulleted list(s) of a message composed within a messaging user interface (e.g., messaging user interface 700) that was sent to one or more client devices.

Figure 9:
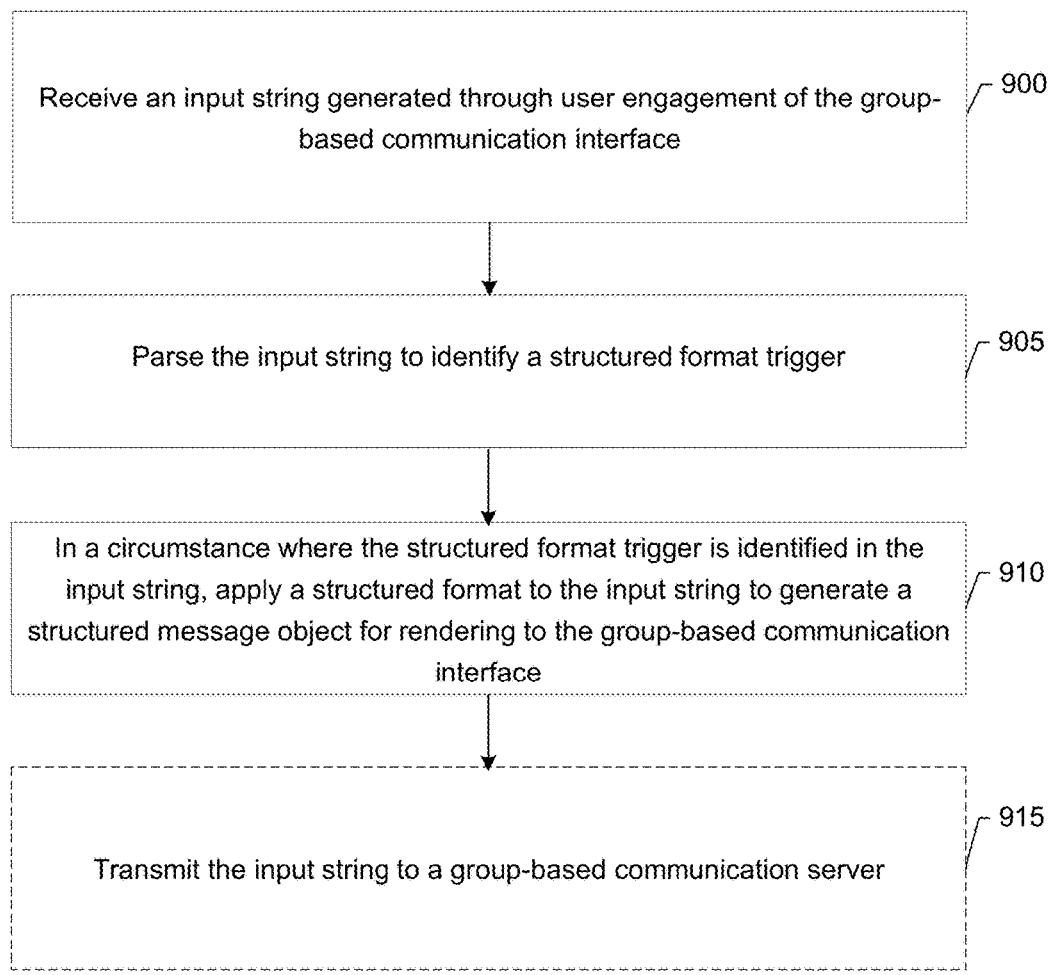
FIG. 9 is another example flowchart illustrating example methods in accordance with some embodiments of the present invention.

Referring now to FIG. 9, an example embodiment of a flowchart for parsing and formatting a message in a group-based communication interface is provided. At operation 900, an apparatus (e.g., client device 101) may receive an input string generated through user engagement of a group-based communication interface (e.g., messaging user interface 700). At operation 905, an apparatus (e.g., client device 101) may parse the input string to identify a structured format trigger. In some exemplary embodiments, the structured format trigger may be a command string(s) (e.g., a command string associated with one or more depressed designated keys (e.g., cmd+b, cmd+i, etc.)) identified within the input string.

At operation 910, an apparatus (e.g., client device 101) may, in a circumstance where the structured format trigger is identified in the input string, apply a structured format (e.g., bold font, italicized font, struck through characters, assigned fixed width characters, and/or a numbered/bulleted list(s), etc.) to the input string to generate a structured message object for rendering to the group-based communication interface. Optionally, at operation 915, an apparatus (e.g., client device 101) may transmit the input string to a group-based communication server (e.g., group-based communication server 113). In some alternative exemplary embodiments, prior to transmitting the input string to a group-based communication server (e.g., group-based communication server 113), an apparatus (e.g., client device 101) may parse the structured message object (e.g., within the group-based communication interface) and may extract a plain text index message object and may perform the transmitting of the input string by transmitting the plain text message object to the group-based communication server (e.g., group-based communication server 113). In some exemplary embodiments, the structured message object may include one or formatted characters of a formatted message being composed within the group-based communication interface (e.g., messaging user interface 700). The plain text index message object may include plain text characters of the message (e.g., composed within the group-based communication interface) without formatting for storage (and indexing) in a memory device (e.g., memory 204 of the group-based communication server 113) according to a message format language of the memory device.

Figure 10:
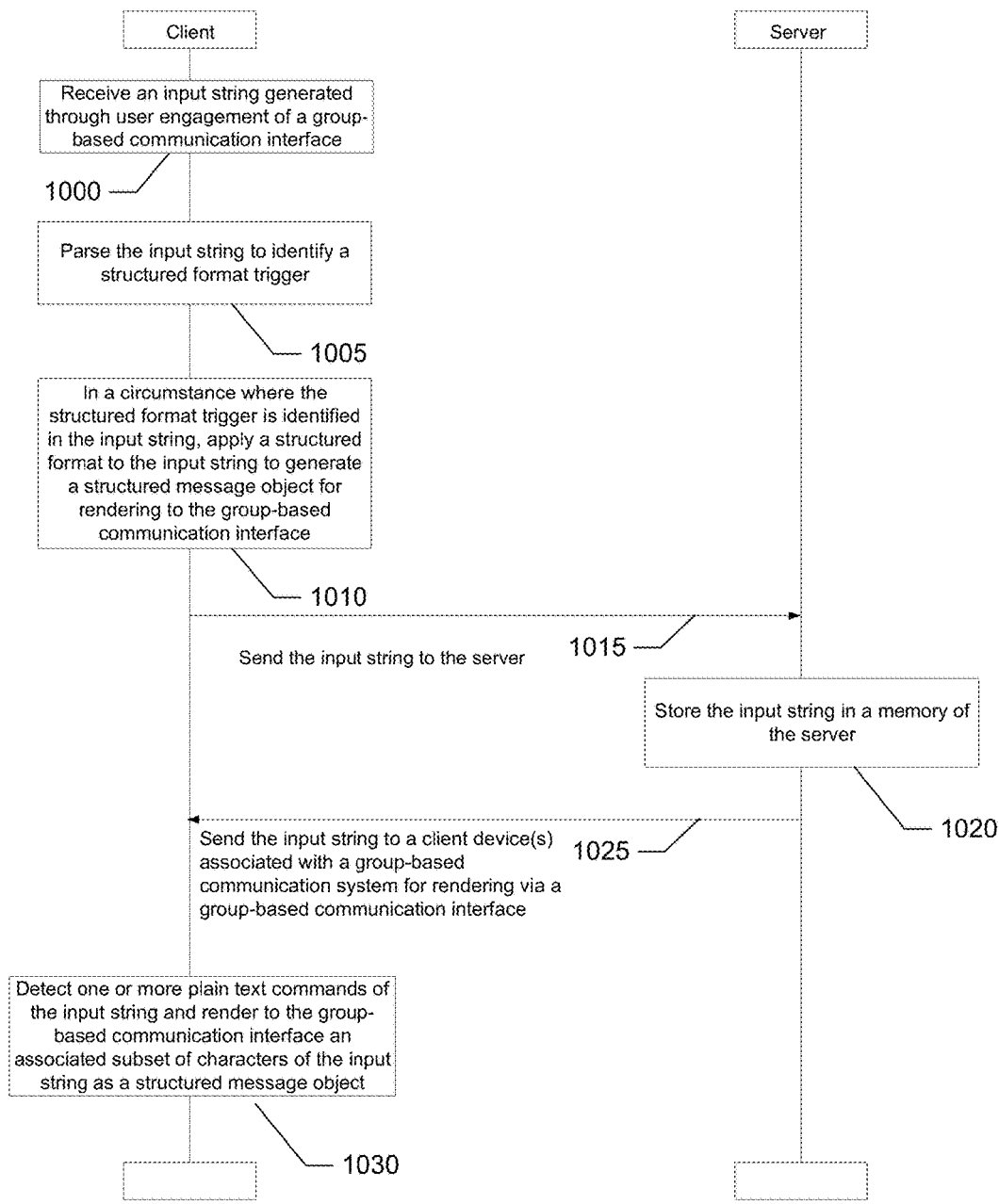
FIG. 10 is a signal diagram illustrating example methods in accordance with some exemplary embodiments of the invention.

Referring now to FIG. 10, an example embodiment of a signal diagram for formatting a message(s) being composed in a group-based communication system according to an example embodiment is provided. At operation 1000, an apparatus (e.g., client device 101) may receive an input string generated through user engagement of a group-based communication interface (e.g., messaging user interface 700). At operation 1005, an apparatus (e.g., client device 101) may parse the input string to identify a structured format trigger. In some exemplary embodiments, the structured format trigger may be a command string(s) (e.g., a command string associated with one or more depressed designated keys (e.g., cmd+b, cmd+i, etc.)) identified within the input string. At operation 1010, an apparatus (e.g., client device 101) may, in a circumstance where the structured format trigger is identified in the input string, apply a structured format (e.g., bold font, italicized font, struck through characters, assigned fixed width characters, and/or a numbered/bulleted list(s), etc.) to the input string to generate a structured message object for rendering to the group-based communication interface.

At operation 1015, an apparatus (e.g., client device 101) may send the input string (e.g., a plain text message object of the input string) to a server (e.g., a group-based communication server 113). At operation 1020, a server (e.g., a group-based communication server 113) may store the input string in a memory (e.g., memory 204) of the server. In some example embodiments, the server (e.g., a group-based communication server 113) may store the input string (e.g., a plain text message object of the input string) in the memory (e.g., memory 204) according to the format language (e.g., a plain text format) of the memory. In an exemplary embodiment, the input string may include one or more plain text (code) commands (e.g., "*" for bold text, "_" for italics, "~" for strikethrough, etc.) associated with formatting of one or more characters (e.g., "What time does *the football game start*?") of the input string.

At operation 1025, the server (e.g., group-based communication server 113) may send the input string (e.g., a plain text message object of the input string) to one or more apparatuses (e.g., client devices 101A-101N) (e.g., associated with a group (e.g., a channel) of the group-based communication system) for rendering (e.g., displaying) via a group-based communication interface of the apparatuses (e.g., for posting the input string to the group (e.g., the channel)).

At operation 1030, an apparatus (e.g., client device 101) may detect one or more plain text commands (e.g., "*" for bold text, "_" for italics, "~" for strikethrough, etc.) of the input string and may render to a group-based communication interface an associated subset of the characters of the input string as a structured message object (e.g., "What time does the football game start?").

Additional Implementation Details

Although example processing systems have been described in FIGS. 1-3, implementations of the subject matter and the functional operations described herein can be implemented in other types of digital electronic circuitry, or in computer software, firmware, or hardware, including the structures disclosed in this specification and their structural equivalents, or in combinations of one or more of them.

Embodiments of the subject matter and the operations described herein can be implemented in digital electronic circuitry, or in computer software, firmware, or hardware, including the structures disclosed in this specification and their structural equivalents, or in combinations of one or more of them. Embodiments of the subject matter described herein can be implemented as one or more computer programs, i.e., one or more modules of computer program instructions, encoded on computer-readable storage medium for execution by, or to control the operation of, information/data processing apparatus. Alternatively, or in addition, the program instructions can be encoded on an artificially-generated propagated signal, e.g., a machine-generated electrical, optical, or electromagnetic signal, which is generated to encode information/data for transmission to suitable receiver apparatus for execution by an information/data processing apparatus. A computer-readable storage medium can be, or be included in, a computer-readable storage device, a computer-readable storage substrate, a random or serial access memory array or device, or a combination of one or more of them. Moreover, while a computer-readable storage medium is not a propagated signal, a computer-readable storage medium can be a source or destination of computer program instructions encoded in an artificially-generated propagated signal. The computer-readable storage medium can also be, or be included in, one or more separate physical components or media (e.g., multiple CDs, disks, or other storage devices).

The operations described herein can be implemented as operations performed by an information/data processing apparatus on information/data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (Application Specific Integrated Circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or information/data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described herein can be performed by one or more programmable processors executing one or more computer programs to perform actions by operating on input information/data and generating output. Processors suitable for the execution of a computer program include, by way of example, both general and special purpose microprocessors, and any one or more processors of any kind of digital computer. Generally, a processor will receive instructions and information/data from a read-only memory, a random access memory, or both. The essential elements of a computer are a processor for performing actions in accordance with instructions and one or more memory devices for storing instructions and data. Generally, a computer will also include, or be operatively coupled to receive information/data from or transfer information/data to, or both, one or more mass storage devices for storing data, e.g., magnetic, magneto-optical disks, or optical disks. However, a computer need not have such devices. Devices suitable for storing computer program instructions and information/data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described herein can be implemented on a computer having a display device, e.g., a CRT (cathode ray tube) or LCD (liquid crystal display) monitor, for displaying information/data to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described herein can be implemented in a computing system that includes a back-end component, e.g., as an information/data server, or that includes a middleware component, e.g., an application server, or that includes a front-end component, e.g., a client device having a graphical user interface or a web browser through which a user can interact with an implementation of the subject matter described herein, or any combination of one or more such back-end, middleware, or front-end components. The components of the system can be interconnected by any form or medium of digital information/data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits information/data (e.g., a Hypertext Markup Language (HTML) page) to a client device (e.g., for purposes of displaying information/data to and receiving user input from a user interacting with the client device). Information/data generated at the client device (e.g., a result of the user interaction) can be received from the client device at the server.

While this specification contains many specific implementation details, these should not be construed as limitations on the scope of any inventions or of what may be claimed, but rather as description of features specific to particular embodiments of particular inventions. Certain features that are described herein in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results, unless described otherwise. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results, unless described otherwise. In certain implementations, multitasking and parallel processing may be advantageous.

CONCLUSION

Many modifications and other embodiments of the inventions set forth herein will come to mind to one skilled in the art to which these inventions pertain having the benefit of the teachings presented in the foregoing description and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation, unless described otherwise.

That which is claimed:

1. An apparatus configured for parsing and formatting a message in a group-based communication interface, the apparatus comprising at least one processor and at least one non-transitory memory including program code, and a display device, wherein the at least one non-transitory memory and the program code are configured to, with the processor, cause the apparatus to at least:
  receive an input string generated through user engagement of the group-based communication interface, wherein the input string is associated with a formatted message;
  parse the input string to identify a structured format trigger, wherein the structured format trigger indicates a structured format for the formatted message; and
  apply the structured format to the input string to generate a structured message object for rendering to the group-based communication interface, wherein the structured format comprises a graphical representation of the formatted message;
  display the structured message object in the group-based communication interface using the display device;
  parse the structured message object to extract a plain text message object; and
  transmit the plain text message object to a group-based communication server for storage by a group-based communication system.

2. The apparatus of claim 1, wherein the memory including the program code is further configured to, with the processor, cause the apparatus to:
  transmit the input string to a group-based communication server.

3. The apparatus of claim 1, wherein:
  the group-based communication interface is associated with one or more group-based communication channels;
  the formatted message is associated with a channel identifier; and
  the channel identifier identifies a first group-based communication channel of the one or more group-based communication channels with which the formatted message is associated.

4. The apparatus of claim 1, wherein the structured format trigger is a command string identified within the input string.

5. The apparatus of claim 4, wherein the structured format applied in response to identifying the structured format trigger comprises at least one of: (i) bolding font of one or more characters of the input string, (ii) italicizing one or more characters of the input string, (iii) striking through one or more characters of the input string, or (iv) applying a fixed-width to one or more characters of the input string.

6. The apparatus of claim 1, wherein the structured format trigger is an ordered list identified within the input string.

7. The apparatus of claim 6, wherein the structured format applied in response to identifying the structured format trigger comprises at least one of: (i) creating a bullet list corresponding to the ordered list identified within the input string, or (ii) creating a number list corresponding to the ordered list identified within the input string.

8. A method configured for parsing and formatting a message in a group-based communication interface, the method comprising:
  receiving an input string generated through user engagement of the group-based communication interface, wherein the input string is associated with a formatted message;
  parsing the input string to identify a structured format trigger, wherein the structured format trigger indicates a structured format for the formatted message; and
  applying the structured format to the input string to generate a structured message object for rendering to the group-based communication interface, wherein the structured format comprises a graphical representation of the formatted message;
  displaying the structured message object in the group-based communication interface using the display device;
  parsing the structured message object to extract a plain text message object; and
  transmitting the plain text message object to a group-based communication server for storage by a group-based communication system.

9. The method of claim 8, further comprising:
  transmitting the input string to a group-based communication server.

10. The method of claim 8, wherein:
  the group-based communication interface is associated with one or more group-based communication channels;
  the formatted message is associated with a channel identifier; and
  the channel identifier identifies a first group-based communication channel of the one or more group-based communication channels with which the formatted message is associated.

11. The method of claim 8, wherein the structured format trigger is a command string identified within the input string.

12. The method of claim 11, wherein the structured format applied in response to identifying the structured format trigger comprises at least one of: (i) bolding font of one or more characters of the input string, (ii) italicizing one or more characters of the input string, (iii) striking through one or more characters of the input string, or (iv) applying a fixed-width to one or more characters of the input string.

13. The method of claim 8, wherein the structured format trigger is an ordered list identified within the input string.

14. The method of claim 13, wherein the structured format applied in response to identifying the structured format trigger comprises at least one of: (i) creating a bullet list corresponding to the ordered list identified within the input string, or (ii) creating a number list corresponding to the ordered list identified within the input string.

15. A computer program product configured for parsing and formatting a message in a group-based communication interface, the computer program product comprising at least one non-transitory computer-readable storage medium having computer-executable program code instructions stored therein, the computer-executable program code instructions comprising:

program code instructions configured to receive an input string generated through user engagement of the group-based communication interface, wherein the input string is associated with a formatted message;

program code instructions configured to parse the input string to identify a structured format trigger, wherein the structured format trigger indicates a structured format for the formatted message; and program code instructions configured to apply a structured format to the input string to generate a structured message object for rendering to the group-based communication interface program code instructions configured to display the structured message object in the group-based communication interface using the display device;

program code instructions configured to parse the structured message object to extract a plain text message object; and program code instructions configured to transmit the plain text message object to a group-based communication server for storage by a group-based communication system.

16. The computer program product of claim 15, further comprising:

program code instructions configured to transmit the input string to a group-based communication server.

17. The computer program product of claim 15, wherein:

the group-based communication interface is associated with one or more group-based communication channels;

the formatted message is associated with a channel identifier; and the channel identifier identifies a first group-based communication channel of the one or more group-based communication channels with which the formatted message is associated.

18. The computer program product of claim 15, wherein the structured format trigger is a command string identified within the input string.

19. The computer program product of claim 18, wherein the structured format applied in response to identifying the structured format trigger comprises at least one of: (i) bolding font of one or more characters of the input string, (ii) italicizing one or more characters of the input string, (iii) striking through one or more characters of the input string, or (iv) applying a fixed-width to one or more characters of the input string.

20. The computer program product of claim 15, wherein the structured format trigger is an ordered list identified within the input string.

* * * * *